3,519,614
REACTIVE AZO DYES CONTAINING TRIAZINE GROUPS QUATERNIZED BY NICOTINIC ACID
Sandro Ponzini, Saronno, Italy, assignor to Aziende Colori Nazionali Affini ACNA S.p.A., Milan, Italy
No Drawing. Filed Aug. 3, 1966, Ser. No. 569,803
Claims priority, application Italy, Aug. 9, 1965, 17,891/65
Int. Cl. C09b 62/38, 62/40, 62/42
U.S. Cl. 260—146                     9 Claims

ABSTRACT OF THE DISCLOSURE

Reactive triazine dyestuffs having the formula:

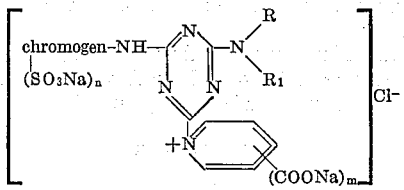

wherein the chromogen is a dyestuff residue selected from the group consisting of azo-, metallized azo, anthraquinone and phthalocyanine dyestuff residues, said chromogen being attached to the —NH— bridging group through a carbon atom of an aromatic nucleus of said chromogen selected from the group consisting of benzene and naphthalene, R and $R_1$ are each selected from the group consisting of hydrogen, phenyl and phenyl substituted with $SO_3H$ and COOH, $n$ is an integer from 1 to 4 and $m$ is 1 or 2, are particularly effective for dyeing cellulose fibers. The dyestuffs may be absorbed and fixed onto the cellulose fibers by known hot or cold dyeing techniques.

---

The present invention relates to a series of reactive triazine dyestuffs capable of being chemically adsorbed and fixed onto cellulose fibers by cold or hot dyeing.

The dyestuffs of the present invention are prepared by means of a quaternization reaction of reactive triazine dyestuffs of the general formula:

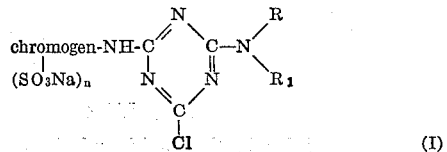

where R and $R_1$ are each selected from the group consisting of hydrogen, alkyl radicals or aryl radicals, which radicals may be substituted with lower alkyls, halogen, $NO_2$, a sulphonic acid group, COOH, etc.; and $n$ is an integer from 1 to 4.

The following amines may be —$NRR_1$ substituents on the second carbon atom of the triazine: sulphonaniline (metanilic, sulphanilic and orthanilic acids) carboxy-anilines such as xylidine, anthranilic acid, toluidine, naphthylamine, sulphonaphthylamines such as 1,4-sulphonaphthylamine, methylamine, dimethylamine, butylamine, hydroxy-alkyl- and bis(hydroxyalkyl)-amines such as ethanol- and diethanolamine, propanolamine, methoxy-propylamine, etc.

The quaternized reactive dyestuffs of the present invention have the general formula

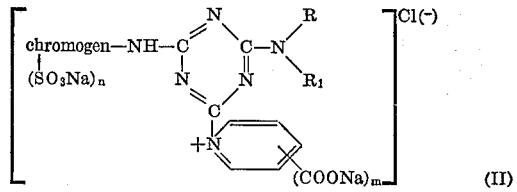

wherein R, $R_1$ and $n$ are as defined above and $m$ is 1 or 2. The chromogen can be the residue of an azo, a metallized azo, an anthraquinone, or a phthalocyanine dyestuff.

The azo dyestuffs of the present invention have formula:

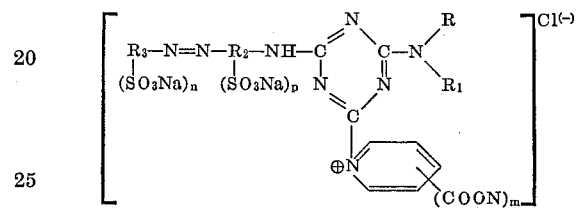

wherein $m$ is 1 or 2, R and $R_1$ are each selected from the group consisting of hydrogen, phenyl, and phenyl substituted with $SO_3H$ and COOH, and wherein $R_2$ and $R_3$ are each a nucleus selected from the group consisting of nuclei of the phenyl and naphthyl series, each of $n$ and $p$ being 0 or an integer from 1 to 4 and the sum of $n$ and $p$ being from 1 to 4.

According to the presently preferred method of producing the dyestuffs of the present invention, the quaternized reactive triazine dyestuffs are prepared by reaction of a metallic salt of isonicotinic acid or one of the lower alkyl esters thereof with a reactive dyestuff within the general Formula I. In this way, reactive dyestuffs are obtained having improved application characteristics, with generally increased tinctorial yields and presenting the advantage of being applicable both by the cold (30–60° C.) and by the hot (70–95° C.) method.

The compounds having the general Formula II are new industrial products.

It is surprising to observe that the quaternization of the dyestuffs of general Formula I with a metallic isonicotinate generally results in dyestuffs which exhibit, with the cold method, higher tinctorial yields than are obtainable by the use as a dyeing catalyst (according to Melliand Textil-Ber. 44, 982–985 (1963)) or promoter of other tertiary organic amines, and particularly as compared with using aliphatic tertiary amines, such as trimethylamine and asymmetric dimethyl-hydrazine. This is all the more remarkable inasmuch as the hydrosolubilizing substituents ($SO_3H$ and COOH) generally diminish the affinity of the dyestuffs towards cellulose fibers.

Also, in the dyeing by the hot method (70–95° C.) of cellulose materials with the same quaternized reactive dyestuffs, improvements of tinctorial yields are observed. In this way, there is provided a class of reactive dyestuffs which can advantageously be applied both by the hot and by the cold method.

The use of isonicotinic acid or of one of its alkyl esters, as the quarternizing agent for the above-mentioned chlorotriazine dyestuffs, usually affords the following advantages with respect to the use of other quaternizable tertiary amines:

(1) Dyeing of the cellulose fibers, by the cold method, without the use of dyeing catalysts.
(2) In most cases, increase of the tinctorial yields, particularly in cold dyeing, with respect to the use of known dyeing catalysts comprising tertiary aliphatic amines.
(3) Contrary to some other tertiary bases, used both as dyeing catalysts and as quaternizing means in the preparation of the dyestuffs, isonicotinic acid is odorless and, therefore, both the cold and the hot dyeing baths are completely without disagreeable or irritating odors.
(4) Increased solubility of the dyestuff.
(5) Possibility of dyeing of cellulose materials by the normal hot method, with the same quaternized dyestuffs, in those cases in which practical considerations would make the hot method preferable.
(6) Having available for the dyeing a rather wide range of usable temperature, it is easier to find, when it is desired to employ a mixture of dyestuffs, especially of different types, a common optimum temperature for fixing the dyestuffs onto the fiber in the dyeing bath, i.e. a temperature apt to give the best tinctorial efficiency for each of the components.
(7) The use of isonicotinic acid also affords cost advantages since the excess reagent employed in the quarternization reaction can be recovered by filtration of the mother liquor, after acidification thereof, and then reused.

The quaternization is preferably carried out by dissolving the dyestuffs in a 2 to 10% solution of a metallic salt of isonicotinic acid. The reaction temperature can be varied between enough wide limits, but is preferably kept between 60–100° C. The reaction rate, of course, is influenced by the temperature and can be followed by means of chromatographic examinations.

The quaternized dyestuffs of the present invention can be used for dyeing natural and synthetic polyamide fibers as well as the above-mentioned cellulose fibers.

The following examples are presented to further illustrate the present invention without in any way limiting the scope thereof. Unless otherwise indicated all parts and percentages are by weight.

EXAMPLE 1

2 parts of isonicotinic acid and 0.64 part of 100% NaOH were dissolved in 100 parts of water. The solution was heated to 75° C. and 4 parts of the following dyestuff were added:

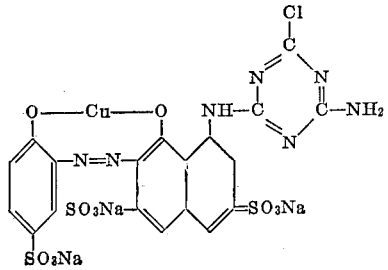

The solution thus obtained was kept at 75° C. overnight (about 15 hours). The quaternized dyestuff was then salted out, filtered, and dried. If desired, the salting out and filtration steps can be omitted and the dyestuff dried directly, at 60° C. in a Niro apparatus (spray drier).

The dyestuff obtained dyed cotton, at a temperature of 35–40° C., with very good tinctorial yields, in a violet shade of excellent fastness to washing.

EXAMPLE 2

2 parts of isonicotinic acid and 0.64 part of 100% NaOH were dissolved in 100 parts of water. The solution was heated to 75° C. and 5 parts of the following dyestuff were added:

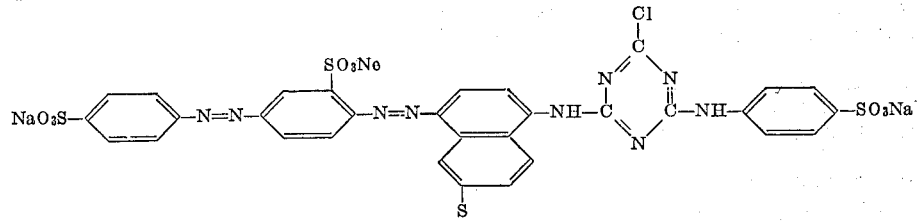

The solution was kept at 70° C. overnight (about 15 hours) and then the procedure described in Example 1 was followed.

The quaternized dyestuff thus obtained dyed cotton, at a temperature of 35–40° C., with very good tinctorial yields, in a brown shade having excellent fastness to washing.

EXAMPLE 3

2 parts of isonicotinic acid and 0.64 part of 100% NaOH were dissolved in 100 parts of water. The solution was heated to 70° C. and then 5 parts of the following dyestuff were added:

Then the procedure described in Example 2 was followed.

The dyestuff thus obtained dyes cellulose material in a black shade of very good tinctorial yield and fastness to washing.

EXAMPLE 4

2 parts of isonicotinic acid and 0.64 part of 100% NaOH were dissolved in 95 parts of water. The solution was heated to 80° C. and 5 parts of the following dyestuff were added:

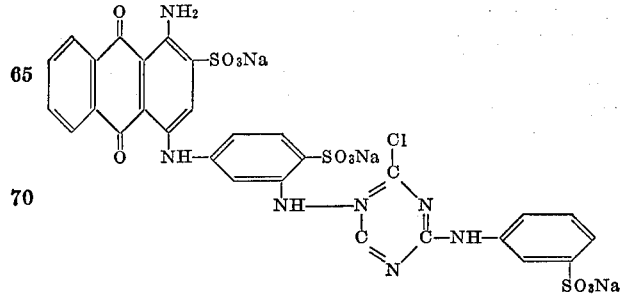

The solution was kept at 80° C. for about 15 hours and then the procedure described in Example 1 was followed. The dyestuff thus obtained dyed cotton, at a temperature of 60° C., in a blue shade of excellent fastness to washing.

EXAMPLE 5

2 parts of isonicotinic acid and 0.64 part of 100% NaOH were dissolved in 95 parts of water. The solution was heated to 80° C. and 4 parts of the following dyestuff were added:

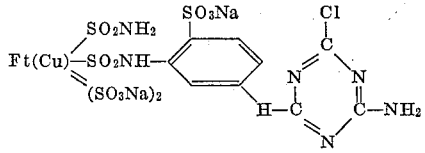

wherein Ft is a phthalocyanine nucleus.

Then the procedure described in Example 4 was followed.

The dyestuff thus obtained dyed cotton, at a temperature of 60° C., in a turquoise shade with very good tinctorial yields and with excellent fastness.

EXAMPLE 6

To 100 parts of water 2 parts of isonicotinic acid, and 0.64 part of 100% NaOH were added. The solution was heated to 80° C. and 4 parts of the following dyestuff were added:

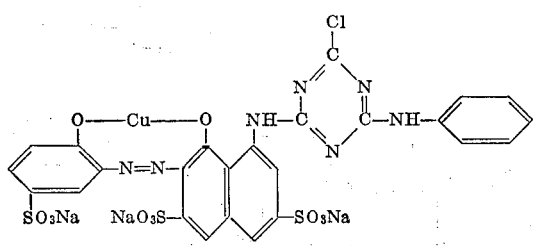

The mass was kept at 80° C. for overnight (about 15 hours). The quaternized dyestuff was dried directly at 60° C. in a Niro apparatus.

The reaction product thus obtained dyed cotton, at a temperature of 35–40° C., with very good tinctorial yields, in a violet shade having excellent fastness to washing.

EXAMPLE 7

2 parts of isonicotinic acid and 0.64 part of 100% NaOH were dissolved in 100 parts of water. The solution was heated to 80° C. and 5 parts of the following dyestuff were added:

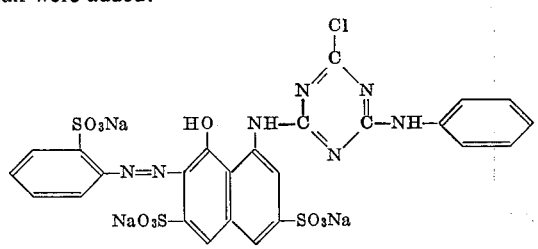

The solution was kept at 80° C. overnight. The quaternized dyestuff was then dried directly at 60° C. in a Niro apparatus.

The reaction product thus obtained dyed cotton, at a temperature of 35–40° C., with very good tinctorial yields, in a red shade having excellent fastness to washing.

EXAMPLE 8

2 parts of the methyl ester of isonicotinic acid were mixed with 7 parts of water and 2 p./vol. of a 36° Bé. NaOH solution and the solution was heated for 30 minutes at 40° C. The pH of the solution was then adjusted to 7.0 with a 10% solution of HCl.

The mass was diluted to 100 parts per volume with water and 4 parts of the following dyestuff were added:

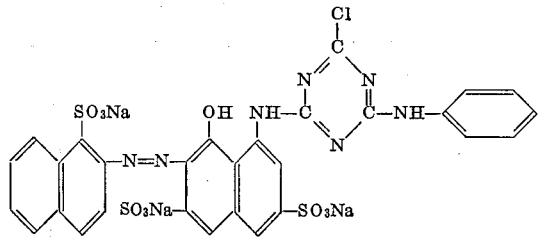

The solution was kept overnight at 90° C. The quaternized dyestuff was dried directly at 60° C.

The thus obtained dyestuff dyed cotton in a red shade having excellent tinctorial yield and fastness to washing.

EXAMPLE 9

A dyeing bath was prepared by dissolving 2 parts of the dyestuff prepared in Example 7 in 2000 parts by volume of water, at a temperature of 35° C.

100 parts of cellulose material were introduced into the dyeing bath.

After 15 minutes, 60 parts of anhydrous $Na_2SO_4$ were added; after further 15 minutes, 60 parts of anhydrous $Na_2SO_4$ were added; after further 15 minutes, 15 parts of $Na_2CO_3$ were added. Finally, after further 15 minutes, 15 parts of $Na_2CO_3$ were added. The dyeing bath was kept at the temperature of 35° C. for another hour in order to complete the fixing of the dyestuff and then the material was treated for 30 minutes at the boiling point with a soap (Marseille-soap) solution having a soap content of 0.3% and rinsed with water.

A cellulose material dyed in a red shade having excellent fastness to wet treatments was obtained, with very good tinctorial yields.

EXAMPLE 10

A dyeing bath was prepared by dissolving 2 parts of the dyestuff prepared in Example 7 in 2000 parts by volume of water, at a temperature of 50° C.

100 parts of cellulose material were introduced into the dyeing bath.

After maintaining the bath at a temperature of 50° C. for 15 minutes, 60 parts of anhydrous $Na_2SO_4$ were added. The temperature of the bath was then adjusted to 60° C. and, after maintaining the bath at 60° C. for 15 minutes, 60 parts of anhydrous $Na_2SO_4$ were added. Then the bath temperature was adjusted to 70° C., maintained for 15 minutes at this temperature, and 15 parts of $Na_2CO_3$ were then added. Then the bath temperature was adjusted to 80° C. and maintained at 80° C. for 15 minutes, whereupon 15 parts of $Na_2CO_3$ were added.

The dyeing bath was kept at 80° C. for another hour. The material was then treated at the boiling point for 30 minutes with a soap solution having a soap content of 0.3% and thoroughly rinsed.

A cellulose material dyed in a red shade having excellent fastness to wet treatments was obtained, with very good tinctorial yields.

Variations can, of course, be made without departing from the spirit and scope of the invention.

Having thus described the invention, what is desired to be secured by Letters Patent and hereby claimed is:

1. A reactive triazine dyestuff having the formula:

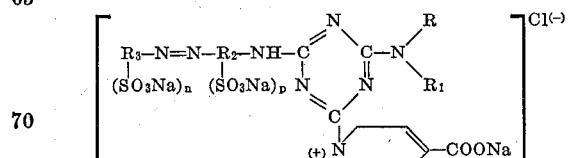

wherein $m$ is 1 or 2; R and $R_1$ are each selected from the group consisting of hydrogen, phenyl and phenyl substituted with $SO_3H$ and $COOH$, and wherein $R_2$ and $R_3$ are each a nucleus selected from the group consisting of nuclei of the phenol and naphthyl series, each of $n$ and $p$ being 0 or an integer from 1 to 4 and the sum of $n$ and $p$ being from 1 to 4.

2. The dyestuff of claim 1 wherein the chromogen is a metallized azo dyestuff.

3. The dyestuff of claim 1 having the formula:

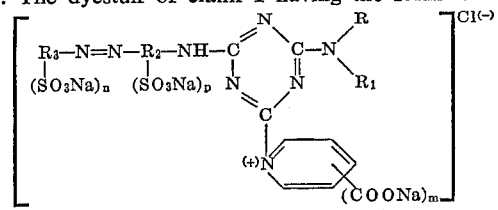

4. The dyestuff of claim 3 which has the structure:

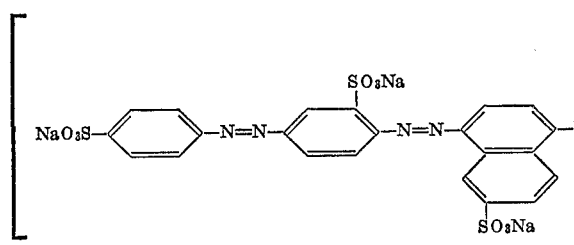

5. The dyesuff of claim 2 which has the structure:

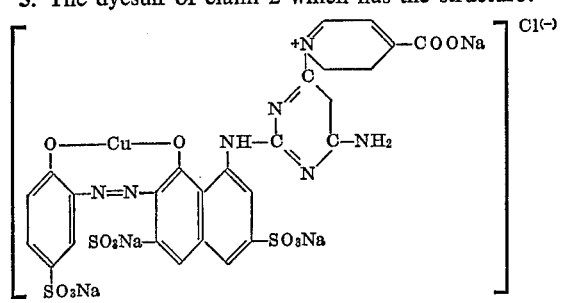

6. The dyestuff of claim 2 which has the structure:

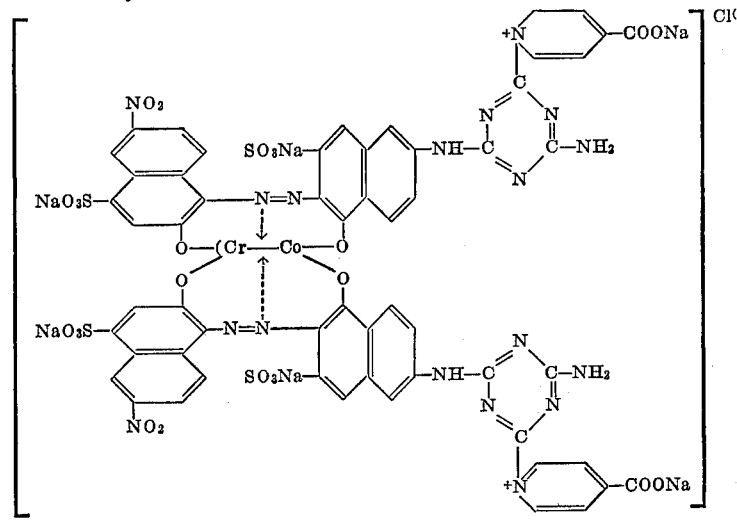

7. The dyestuff of claim 3 which has the structure:

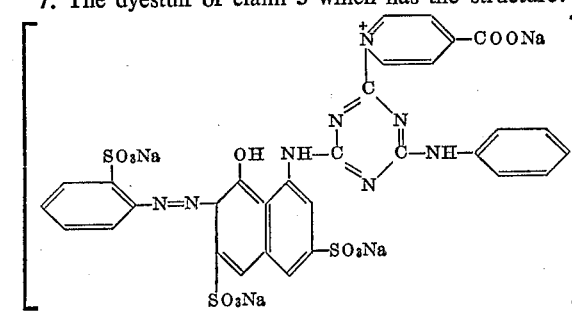

8. The dyestuff of claim 2 which has the structure:

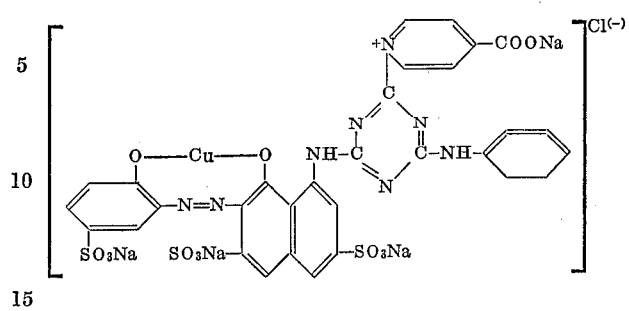

9. The dyestuff of claim 3 which has the structure:

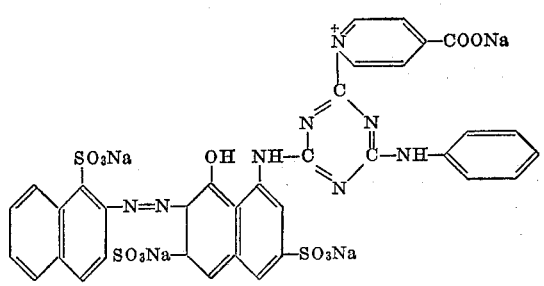

References Cited

UNITED STATES PATENTS 3,116,275  12/1963  Gamlen et al. ____ 260—153 XR

FOREIGN PATENTS 946,998  1/1964  Great Britain.
982,479  2/1965  Great Britain.

FLOYD DALE HIGEL, Primary Examiner

U.S. Cl. X.R.

260—153, 249, 242; 8—41, 42, 40, 54.2, 55, 50

UNITED STATES PATENT OFFICE
CERTIFICATE OF CORRECTION

Patent No. 3,519,614        Dated July 7, 1970

Inventor(s) Sandro Ponzini

It is certified that error appears in the above-identified patent and that said Letters Patent are hereby corrected as shown below:

Column 2, line 15, "invention have for-" should read -- invention have the --. Column 2, second structural formula

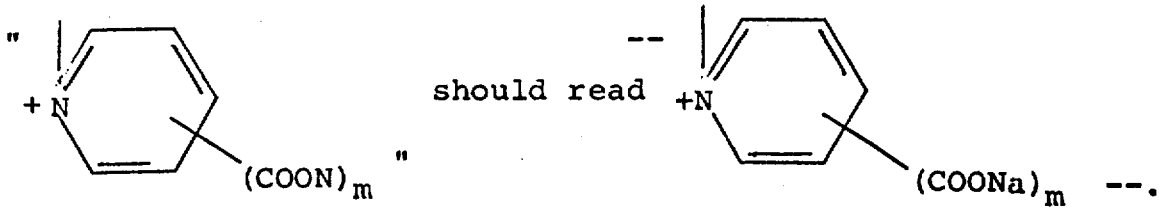 should read

Columns 3 and 4, first structural formula

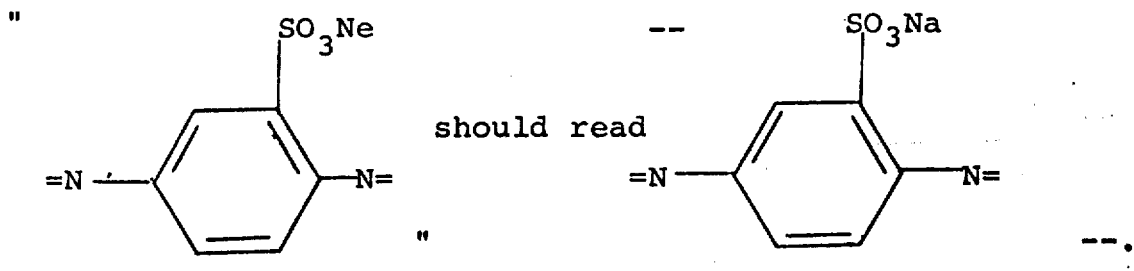 should read

Columns 3 and 4, first structural formula

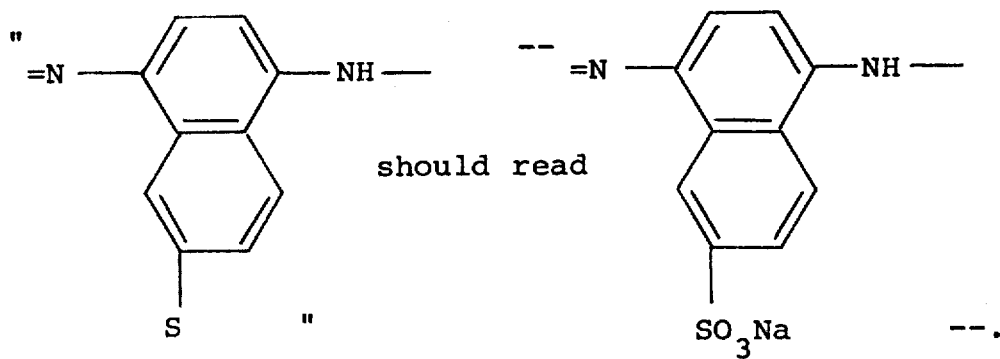 should read

UNITED STATES PATENT OFFICE
CERTIFICATE OF CORRECTION

Patent No. 3,519,614        Dated July 7, 1970

Inventor(s) Sandro Ponzini

It is certified that error appears in the above-identified patent and that said Letters Patent are hereby corrected as shown below:

Column 5, first structural formula

" 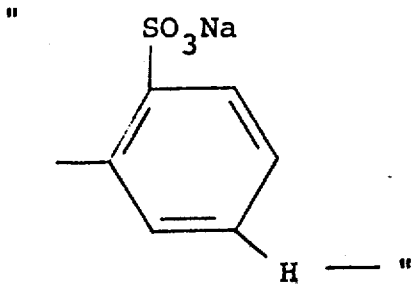     H ——  "      should read     -- 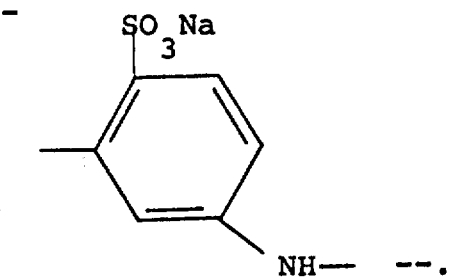    NH——  --.

Column 6, the structural formula in claim 1

" 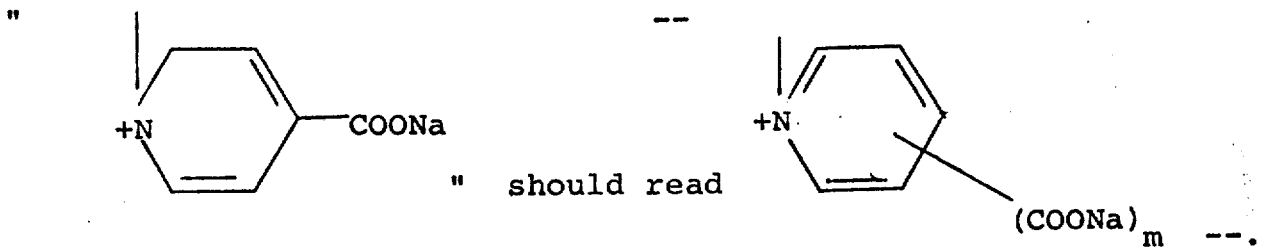 "    should read    -- ... --.

Column 7, claim 2, "wherein the chromogen" should read -- which --; the structural formula in claim 3

" 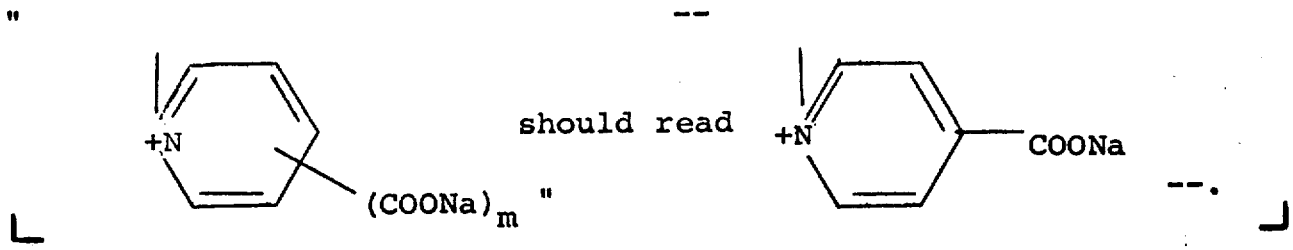 "    should read    -- ... --.

UNITED STATES PATENT OFFICE
CERTIFICATE OF CORRECTION

Patent No. 3,519,614                 Dated July 7, 1970

Inventor(s) Sandro Ponzini

It is certified that error appears in the above-identified patent and that said Letters Patent are hereby corrected as shown below:

Column 7, claim 4 " ]Cl(_)    should read -- ]Cl(-) --.

Column 7, claim 5

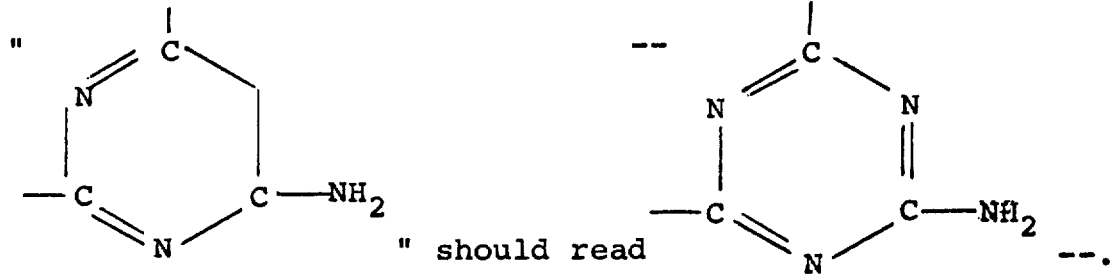

" should read --  --.

-3-

PO-1050
(5/69)

UNITED STATES PATENT OFFICE
CERTIFICATE OF CORRECTION

Patent No. 3,519,614                                  Dated July 7, 1970

Inventor(s) Sandro Ponzini

It is certified that error appears in the above-identified patent and that said Letters Patent are hereby corrected as shown below:

Column 7, claim 6, "-(Cr-Co-" should read -- -(Cr-Co)- --;

claim 7 " 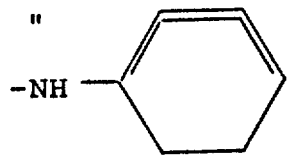 should read 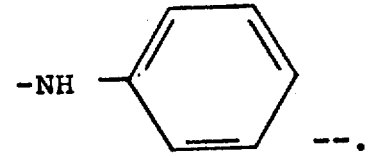 --.

Column 8, claim 8,

"  " should read -- -NH—⌬ --.

Column 8, claim 9,

-- [ ] Cl(-) --        should be placed around the structural formula.

-4-

UNITED STATES PATENT OFFICE
CERTIFICATE OF CORRECTION

Patent No. 3,519,614                     Dated July 7, 1970

Inventor(s) Sandro Ponzini

It is certified that error appears in the above-identified patent and that said Letters Patent are hereby corrected as shown below:

Column 8, the structural formula in claim 9

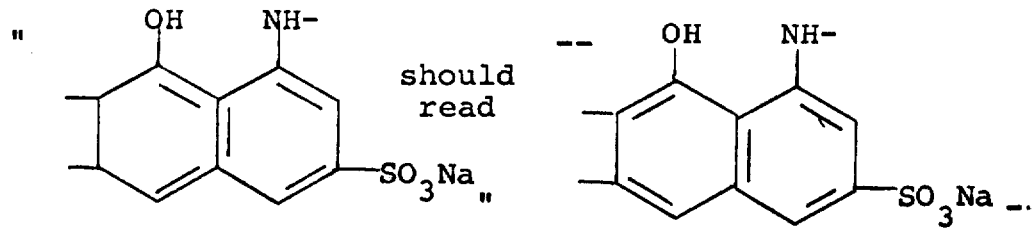

Signed and sealed this 24th day of August 1971.

(SEAL)
Attest:

EDWARD M. FLETCHER, JR.
Attesting Officer

WILLIAM E. SCHUYLER, JR.
Commissioner of Patents